United States Patent [19]
Vickerman

[11] Patent Number: 5,653,320
[45] Date of Patent: Aug. 5, 1997

[54] TAPERED ROLLER ONE-WAY CLUTCH

[76] Inventor: David Vickerman, 2475 Dunwoody Ave., Wayzata, Minn. 55391

[21] Appl. No.: 615,121

[22] Filed: Mar. 13, 1996

[51] Int. Cl.$^6$ ............................. F16D 41/066; F16D 15/00
[52] U.S. Cl. ........................ 192/45; 192/110 B; 192/111 A
[58] Field of Search ............................ 192/45, 38, 44, 192/111 A, 110 B; 384/194, 228, 571; 188/82.84

[56] References Cited

U.S. PATENT DOCUMENTS

| | | | |
|---|---|---|---|
| 169,864 | 11/1875 | Teahl | 384/571 X |
| 524,530 | 8/1894 | Porter | 192/45 |
| 4,989,705 | 2/1991 | Kashio et al. | 192/45 |
| 5,156,246 | 10/1992 | Iga | 188/45 |
| 5,186,548 | 2/1993 | Sink . | |
| 5,380,102 | 1/1995 | Sink . | |
| 5,433,305 | 7/1995 | Takamatsu et al. | 192/45 |

FOREIGN PATENT DOCUMENTS

| | | | |
|---|---|---|---|
| 452700 | 4/1975 | U.S.S.R. | 192/45 |

OTHER PUBLICATIONS

Four page printout of a Dialog® computer database search. (undated).

*Primary Examiner*—Rodney H. Bonck
*Attorney, Agent, or Firm*—Palmatier, Sjoquist, Helget & Voigt, P.A.

[57] ABSTRACT

A tapered roller one-way clutch for use with vertical shafts having an outside surface comprising a clutch housing having a bore extending through the housing and the vertical shaft rotatably inserted into the bore, a plurality of roller pockets are formed on the inside surface of the bore, the roller pockets extend axially along the inside surface of the bore from near the top of the bore to near the bottom of the bore and are spaced equally around a circumference of the bore, each roller pocket further comprises a roller landing tapering away from the axis of the bore to a roller shoulder formed along a diameter of the bore, a tapered roller having an outer surface is rotatably held in each roller pocket by the shaft outside surface, the roller landing is inclined to the axis of the bore to allow the outer roller surface to roll along the shaft outside surface and hold the tapered roller at an angle to maximize surface contact, the roller landing having an arcuate or helical shape from the roller shoulder to the inside cylindrical surface to allow the tapered roller to roll along and move laterally as the vertical shaft is moved in a clutching direction causing the tapered roller to bind the vertical shaft between the roller landing and the outside shaft surface.

20 Claims, 1 Drawing Sheet

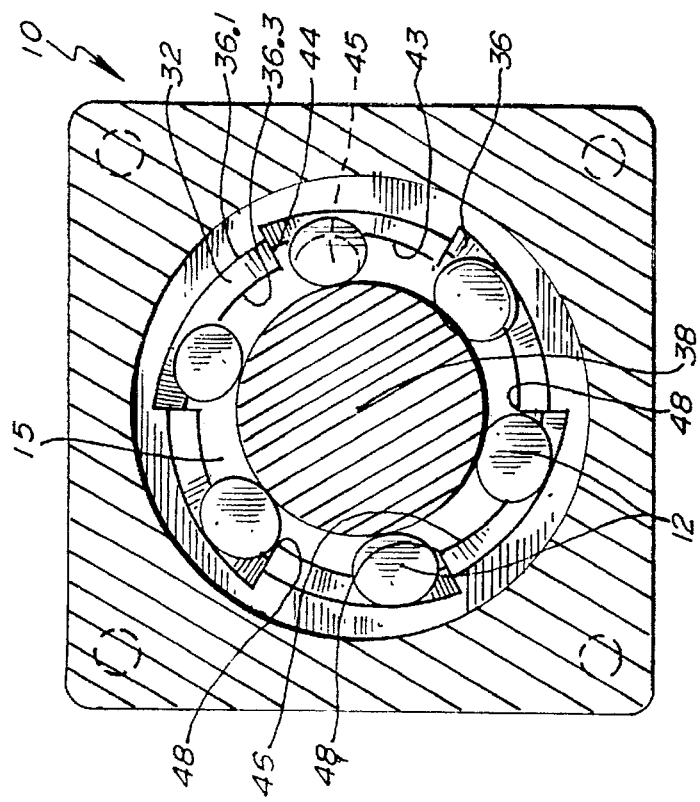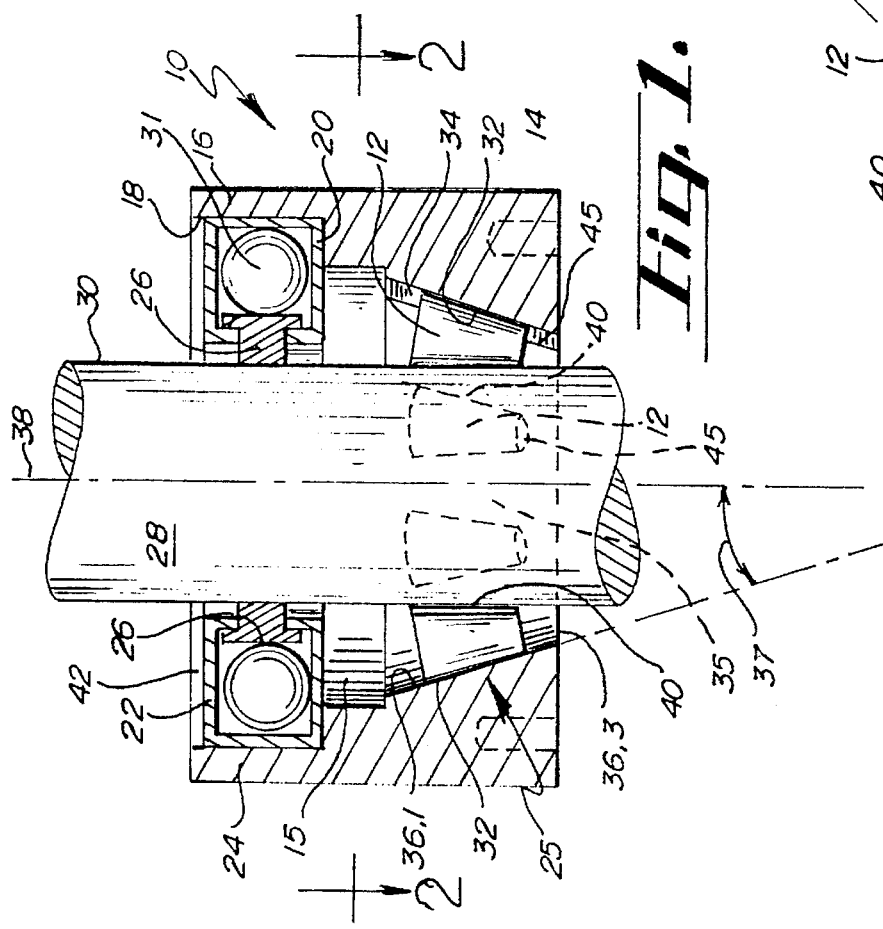

TAPERED ROLLER ONE-WAY CLUTCH

BACKGROUND OF THE INVENTION

The present invention relates to a one-way clutch for use with a vertical shaft which uses gravity and extended roller pockets to adjust for wear in the tapered rollers.

One-way clutches are used in mechanical designs to allow a shaft to rotate in one direction with respect to a housing while binding to the shaft preventing rotation in a second clutching direction. One-way clutches, specifically overrunning clutches use rollers of various shapes in combination with a tapered surface to provide free rotation in one direction only.

In some applications, such as home appliances, a vertical shaft is used in combination with a one-way clutch to transmit rotation from the vertical drive shaft in one direction only. In these applications, the vertical drive shaft typically rotates at less than 1,500 RPMs. Due to the high volume production of these devices a one-way clutch must be simple and inexpensive to built and apply.

A number of one-way clutches exist which may be used to transmit rotation from a shaft in only one direction. These devices do not provide a means for automatically adjusting the point of contact between the tapered rollers, the vertical shaft and the clutch housing as the rollers wear to a smaller dimension. Furthermore, devices may exist which include complex designs wherein rollers are held in place by a retainer which limits the motion of the rollers. These devices may also employ the use of inner and outer races which surround the rollers and are positioned between the shaft and the clutch housing. The present invention is designed to overcome these limitations while providing a low cost easy to manufacturer one-way clutch for vertical shafts.

SUMMARY OF THE INVENTION

A tapered roller one-way clutch for use with vertical drive shafts having an outside surface comprising a clutch housing having a bore extending through the housing and the vertical shaft rotatably inserted into the bore, a plurality of roller pockets are formed on the inside surface of the bore, the roller pockets extend axially along the inside surface of the bore from near the top of the bore to near the bottom of the bore and are spaced equally around a circumference of the bore, each roller pocket further comprises a roller landing tapering away from the axis of the bore to a roller shoulder formed along a diameter of the bore, a tapered roller hiring an outer surface is rotatably held in each roller pocket by the shaft outside surface, the roller landing is inclined to the axis of the bore to allow the outer roller surface to roll along the shaft outside surface and hold the tapered roller at an angle to maximize surface contact, the roller landing having an arcuate or helical shape from the roller shoulder to the inside cylindrical surface to allow the tapered roller to roll along and move laterally as the vertical shaft is moved in a clutching direction causing the tapered roller to bind the vertical shaft between the roller landing and the outside shaft surface.

An object of the present invention is to provide a low cost one-way clutch for use with vertical shaft.

Another object of the present invention is to provide a one-way clutch which uses gravity to adjust the position of the tapered roller to allow for wear.

Another object of the present invention is a one-way clutch having a bearing mounted in the housing for low cost assembly on a vertical shaft.

A feature of the present invention is a roller pocket which extends along the length of the inside cylindrical surface of the bore.

Another feature of the present invention is a housing which may accommodate both an antifriction bearing and the clutch mechanism.

Another feature of the present invention is an inclined roller landing to allow maximum surface contact between the tapered roller and the vertical shaft.

An advantage of the invention is the design does not restrict the rotation of the rollers through a cage or retainer.

Another advantage of the invention is a housing which may be formed from powered metal or synthetic composite materials.

Another advantage of the present invention is a design which uses gravity to automatically adjust for wear.

BRIEF DESCRIPTION OF THE DRAWINGS

FIG. 1 is a section view of the tapered roller one-way clutch.

FIG. 2 is a top section view of the vertical shaft extending through the clutch taken at approximately 2—2 of FIG. 1.

FIG. 3 is a perspective view of a tapered roller.

DETAILED SPECIFICATION

Referring to FIG. 1, the tapered roller clutch illustrated in general by the numeral 10 comprises a plurality of tapered rollers 12 in clutch housing 14. Clutch housing 14 has a centrally positioned bore 15 extending therethrough. Bearing bushing 16 is adjacent one end of the bore 15. Bearing bushing 16 has bearing surface 18 spaced from vertical drive shaft 28 and bearing shoulder 20 for retaining antifriction bearing 22 therein. The clutch housing 14 may be formed from powered metal or composites or engineered plastics.

Continuing to refer to FIG. 1, antifriction bearing 22 fits in clutch housing 14. Antifriction bearing 22 has exterior ring 24 pressed into a secure friction fit along bearing surface 18. Antifriction bearing 22 rests on bearing shoulder 20 to separate antifriction bearing 22 from clutching mechanism indicated in general by the numeral 25. Vertical shaft mount shown as inside ring 26 is pressed onto vertical drive shaft 28 to securely fit around outside surface 30 of vertical drive shaft 28. Antifriction balls or rollers 31 extend between exterior ring 24 and inside ring 26 to allow vertical drive shaft 28 to freely rotate within clutch housing 14.

Referring to FIGS. 1 and 2, clutching mechanism 25 comprises tapered rollers 12 retained in roller pockets 36 formed in the clutch housing 14 and spaced equally around the vertical drive shaft 28. Roller pockets 36 extend from clutch top 36.1 to clutch bottom 36.3. Each roller pocket 36 may extend axially along bore 15 and may have a helical shape with respect to the drive shaft axis. Each roller pocket 36 comprises a tapered roller landing 32 and a roller shoulder 34 adjacent to and formed at an angle to the roller landing 32. Roller shoulder 34 may be formed along a shoulder angle 35 to the drive shaft axis 38. The roller pockets 36 may be formed in the bore 15 at an equal angular distance from each other around the drive shaft axis 38 to form a symmetrical pattern. As may be seen in FIG. 2, six roller pockets 36 may be formed at approximately a 60° angle to adjacent roller pockets 36 measured from drive shaft axis 38. This angular measurement is for illustration purposes only and is not intended to limit the invention to six tapered rollers 12 or other specific measurements.

Referring to FIG. 1, tapered roller landings 32 are formed at a slope angle 37 with respect to drive shaft axis 38.

Tapered roller 12 has outer roller surface 40. Tapered roller landings 32 have a slope angle 37 between clutch top 36.1 and clutch bottom 36.3 sufficient to allow outer roller surface 40 to roll along and maintain contact with outside surface 30 of vertical drive shaft 28. Each of the tapered roller landings 32 extends from roller shoulder 34 in the same direction, either clockwise or counterclockwise depending on the desired rotation of the vertical drive shaft 28.

As may be seen in FIGS. 1 and 3, for the purpose of illustration, tapered roller 12 may be selected by reference to desired taper angle 42. Taper angle 42 may be 1° to 20°. Taper angle 42 is measured as the angular relationship between outer roller surfaces 40 and roller axis 41. In this embodiment, tapered roller landing 32 has a slope angle 37 of 2° to 20° with respect to drive shaft axis 38. The first angular measurement defining the taper angle 42, shoulder angle 35 and slope angle 37 allows outer roller surface 40 to maintain contact with outside surface 30 of the vertical drive shaft 28 along the entire length of tapered roller 12. The substantially similar angular measurement of the tapered roller 12, shoulder angle 35 and tapered roller landing 32 is designed to assure the portion of the outer roller surface 40 engaging outside surface 30 at circumference 29 is axially aligned with drive shaft axis 38 at the point of engagement. The angles and measurements are for illustration purposes only and not meant in any way to limit the scope of the invention.

Referring to FIGS. 1 and 2, tapered roller landing 32 has an arcuate or helical shape and is spaced from outside surface 30 by separation 43. Each tapered roller landing 32 has a first edge 44 adjacent roller shoulder 34 and a second edge 46 adjacent inside surface 48 of bore 15. Separation 43 has a size adjacent roller shoulder 34 sufficient to retain and allow tapered roller 12 to freely rotate as outer roller surface 40 rolls along outside surface 30 of the vertical drive shaft 28. The size of separation 43 is larger at the first edge 46 adjacent the roller shoulder 34 than at second edge 46. The separation size progressively becomes smaller from the first edge 44 to second edge 46. The size of separation 43 also defines a large size at clutch top 36.1 and a smaller size at clutch bottom 36.3. The size of separation 43 progressively becomes smaller from clutch top 36.1 to clutch bottom 36.3.

In operation, vertical drive shaft 28 is inserted through clutch housing 14 and pressed through antifriction bearing 22 at inside ring 26. Tapered rollers 12 are inserted into roller pockets 36 having one tapered roller 12 per roller pocket 36 with the tapered rollers 12 small end 45 oriented downwardly.

It should be understood from the illustration of FIG. 2, vertical drive shaft 28 will be allowed to rotate in a counterclockwise direction. Tapered rollers 12 are supported and rotate in roller pockets 36 with outer roller surface 40 rolling along outside surface 30 of vertical drive shaft 28 and tapered roller landing 32 to allow free rotation of vertical drive shaft 28 in the counterclockwise direction.

Clockwise rotation of vertical drive shaft 28 causes tapered rollers 12 to bear against and engage outside surface 30 of vertical drive shaft 28 and tapered roller landing 32. The rotational motion of outer roller surface 40 along a tapered roller landing 32 urges tapered roller 12 laterally away from roller shoulder 34 and towards the second edge 46 of the tapered roller landing 32. As the size of separation 43 at the contact point of tapered roller landing 32 with tapered roller 12 becomes smaller, vertical drive shaft 28 is clutched by tapered rollers 12 binding against tapered roller landing 32 and outside shaft surface 30 which stops the rotation of vertical drive shaft 28.

Rotation of the vertical drive shaft 28 in a counterclockwise direction urges tapered rollers 12 to move laterally towards roller shoulder 34 and upwardly along inclined tapered roller landing 32 where the size of separation 43 is large enough to allow outer roller surface 40 to roll freely along outside surface 30 allowing the vertical drive shaft 28 to continue rotating. It should be understood gravity bears against each tapered rollers 12 to urge the tapered roller 12 toward the clutch bottom 36.3, whereby as the tapered roller 12 wears, causing a circumference of the outer roller surface 40 to diminish, the tapered roller 12 will advance down the inclined surface of the tapered roller landing 32 to automatically adjust for the new size of the circumference of tapered roller 12.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. A combination one-way tapered roller clutch and vertical drive shaft comprising:
   a clutch housing having a bore extending through the housing, the bore having an inside surface and a circumference;
   a vertical drive shaft having a drive shaft axis and an outside surface, said vertical drive shaft rotatably inserted into the bore;
   a plurality of roller pockets formed on the inside surface of the bore and spaced equally around the bore, each roller pocket having a roller landing and a roller shoulder, each roller landing being inclined with respect to the drive shaft axis defining a slope angle; and
   a tapered roller positioned in each roller pocket and bearing against the outside surface of the vertical drive shaft and one roller landing.

2. The invention of claim 1 wherein each roller landing extends axially along a portion of the inside surface of the bore.

3. The invention of claim 1 further comprising a clutch top and a clutch bottom, the roller pockets extending axially along the bore from the clutch top to the clutch bottom.

4. The invention of claim 3, each roller landing further comprising a separation extending from the roller landing to the outside surface of the vertical drive shaft defining a separation size, the separation size being larger adjacent to clutch top and smaller adjacent to clutch bottom.

5. The invention of claim 3 wherein gravity bears against the tapered rollers to urge each tapered roller into the roller pocket.

6. The invention of claim 1, each of said tapered rollers further comprising an outer roller surface and a taper angle.

7. The invention of claim 6 wherein the taper angle measurement is between 5° and 10°.

8. The invention of claim 1, said clutch housing further comprising a bearing shoulder adjacent the bore, a bearing bushing on the bearing shoulder, the bearing bushing comprising a bearing surface spaced from the vertical drive shaft.

9. The invention of claim 8, said clutch housing further comprising an antifriction bearing intermediate to the bearing surface and the outside surface of the vertical drive shaft.

10. The invention of claim 9 wherein the antifriction bearing is urged away from the roller pockets by the bearing shoulder.

11. The invention of claim 1 wherein each roller pocket extends from the roller landing in a direction counterclockwise from the roller shoulder.

12. The invention of claim 1 wherein the slope angle measurement is between 5° and 10°.

13. The invention of claim 1, each of said roller landings further comprising a first edge adjacent to the roller shoulder and a second edge adjacent to the inside surface of the bore, a separation extending from the outside surface of the vertical drive shaft to the roller landing defining a separation size, the separation size being larger adjacent the first edge of the roller landing and smaller adjacent second edge of the roller landing.

14. The invention of claim 13 wherein each roller landing has a helical shape with respect to the drive shaft axis.

15. The invention of claim 13 wherein each roller landing has an arcuate shape.

16. A combination one-way tapered roller clutch and a vertical drive shaft comprising:

a clutch housing having a bore extending through the housing and a bearing bushing, the bore having an inside surface, the bearing bushing having a bearing surface, a bearing shoulder intermediate to the bearing bushing and the bore;

the vertical drive shaft having an outside surface and a drive shaft axis, the vertical drive shaft rotatably inserted into the bore and extending through the bushing, the outside surface of the vertical drive shaft spaced from the bearing surface;

an antifriction bearing on the bearing shoulder intermediate to the outside surface of the vertical drive shaft and the bearing surface;

a plurality of roller pockets in the bore, the roller pockets spaced equally around the drive shaft axis, each roller pocket comprising a roller shoulder and a tapered roller landing inclined with respect to the drive shaft axis, a separation from the outside surface of the vertical drive shaft to the roller landing defining a size; and a tapered roller positioned in each roller pocket, each tapered roller comprising an outer roller surface bearing against the outside surface of the vertical drive shaft.

17. The invention of claim 16 further comprising a clutch top and a clutch bottom, the roller pockets extending axially along the drive shaft axis from the clutch top to the clutch bottom, the separation size being larger adjacent the clutch top and smaller adjacent the clutch bottom.

18. The invention of claim 16, each roller shoulder forming a shoulder angle with respect to the drive shaft axis.

19. A combination one-way tapered roller clutch and a vertical drive shaft comprising:

a clutch housing having a bore extending through the housing, the bore having an inside surface, a clutch top and a clutch bottom;

the vertical drive shaft having an outside surface, a drive shaft axis, and a circumference rotatably inserted in the bore;

a plurality of roller pockets formed on the inside surface of the bore, the roller pockets extending axially along the bore and spaced equally around the drive shaft axis, each roller pocket having a tapered roller landing and a roller shoulder, the roller landing inclined to the drive shaft axis at a slope angle, the roller shoulder forming a shoulder angle with respect to the drive shaft axis, a separation extending from the roller landing to the outside surface of the vertical drive shaft defining a separation size, the separation size being larger adjacent to clutch top and smaller adjacent to clutch bottom; and a tapered roller in each roller pocket, each tapered roller having an outer roller surface whereby the outer roller surface of each tapered roller bears against and rolls along the outside surface of the vertical drive shaft, and the roller landing urging the tapered roller to roll along the tapered roller landing adjacent the roller shoulder when the vertical drive shaft is rotated in a first direction, the tapered roller landing and outside surface of the vertical drive shaft bearing against the tapered roller to urge the tapered roller away from the roller shoulder as the vertical drive shaft is rotated in a second direction causing the tapered roller to move laterally and bind between the outside surface of the vertical drive shaft and the roller landing rotation of the Shaft with respect to the housing.

20. The invention of claim 19, each of said roller landings further comprising a first edge adjacent the roller shoulder and a second edge adjacent the inside surface of the bore, the size of the separation size being larger adjacent the first edge of the roller landing and smaller adjacent second edge of the roller landing, and a first angular measurement defining each of the shoulder angle, the slope angle and the taper angle.

* * * * *

UNITED STATES PATENT AND TRADEMARK OFFICE
CERTIFICATE OF CORRECTION

PATENT NO.  : 5,653,320
DATED       : August 5, 1997
INVENTOR(S) : David Vickerman It is certified that error appears in the above-identified patent and that said Letters Patent is hereby corrected as shown below:

Column 1, line 21, delete "built" and replace it with --build--.

Column 1, line 34, delete "manufacturer" and replace it with --manufacture--.

Column 1, line 48, delete "hiring" and replace it with --having--.

Column 6, line 38, delete "Shaft" and replace it with --shaft--.

Signed and Sealed this

Ninth Day of December, 1997

Attest:

BRUCE LEHMAN

Attesting Officer

Commissioner of Patents and Trademarks